United States Patent
Shen et al.

(10) Patent No.: US 9,718,105 B2
(45) Date of Patent: Aug. 1, 2017

(54) INDIRECT THERMAL DESORPTION DEVICE WITH TWO-SECTION SCREW CONVEYORS

(71) Applicant: Xiaojiang Shen, Jiaxing, Zhejiang (CN)

(72) Inventors: Xiaojiang Shen, Zhejiang (CN); Hua Guo, Zhejiang (CN); Feng Yao, Zhejiang (CN); Jianping Weng, Zhejiang (CN)

(73) Assignee: Xiaojiang Shen, Jiaxing, Zhejiang (CN)

( * ) Notice: Subject to any disclaimer, the term of this patent is extended or adjusted under 35 U.S.C. 154(b) by 0 days.

(21) Appl. No.: 15/319,786

(22) PCT Filed: Apr. 21, 2016

(86) PCT No.: PCT/CN2016/079852
§ 371 (c)(1),
(2) Date: Dec. 18, 2016

(87) PCT Pub. No.: WO2016/173448
PCT Pub. Date: Nov. 3, 2016

(65) Prior Publication Data
US 2017/0136510 A1 May 18, 2017

(30) Foreign Application Priority Data

Apr. 27, 2015 (CN) .......................... 2015 1 0207851

(51) Int. Cl.
*B09C 1/06* (2006.01)
*B65G 33/14* (2006.01)
(Continued)

(52) U.S. Cl.
CPC ............ *B09C 1/06* (2013.01); *B01D 53/0407* (2013.01); *B09C 1/005* (2013.01); *B09C 1/02* (2013.01);
(Continued)

(58) Field of Classification Search
CPC .. B09C 1/06; B09C 1/005; B09C 1/08; B01D 53/0407; B65G 33/14
See application file for complete search history.

(56) References Cited

U.S. PATENT DOCUMENTS 5,221,512 A * 6/1993 Sancinelli ............... C21B 5/026
266/156
5,242,245 A * 9/1993 Schellstede ............... B09C 1/06
110/346
(Continued)

FOREIGN PATENT DOCUMENTS

CN 104785515 A 7/2015
CN 204583847 U 8/2015

*Primary Examiner* — Benjamin Fiorello

(57) ABSTRACT

An indirect thermal desorption device with two-section screw conveyors, includes: an upper skid and a lower skid below the upper skid. An upper layer thermal desorption chamber, a feeding hopper, an feed airlock, an air pre-heater, a blower; a first quench spray tower, a second quench spray tower, a demister and an induced draft fan are provided in the upper skid. A lower layer thermal desorption chamber, an activated carbon filter tank, a combustion chamber, a discharge hopper and an discharge airlock are provided inside the lower skid. A first screw conveyor is provided in the upper layer thermal desorption chamber, and an upper layer fume jacket is covered on the upper layer thermal desorption chamber. A second screw conveyor is provided in the lower layer thermal desorption chamber, and a lower layer fume jacket is covered on the lower layer thermal desorption chamber.

8 Claims, 1 Drawing Sheet

(51) Int. Cl.
*B09C 1/08* (2006.01)
*B09C 1/02* (2006.01)
*B09C 1/00* (2006.01)
*B01D 53/04* (2006.01)

(52) U.S. Cl.
CPC ............... *B09C 1/08* (2013.01); *B65G 33/14* (2013.01); *B01D 2253/102* (2013.01)

(56) References Cited

U.S. PATENT DOCUMENTS

| | | | | |
|---|---|---|---|---|
| 5,382,002 | A * | 1/1995 | Evans | B09C 1/06 266/173 |
| 6,271,501 | B1 * | 8/2001 | Morgan | F27B 7/06 110/203 |
| 6,399,851 | B1 * | 6/2002 | Siddle | C22B 7/001 110/295 |
| 7,514,049 | B2 * | 4/2009 | Kapila | B09C 1/06 110/295 |
| 7,514,949 | B2 * | 4/2009 | Kang | G01R 31/318511 324/762.05 |
| 2003/0136747 | A1 * | 7/2003 | Wood | B09B 3/0091 210/774 |
| 2008/0128134 | A1 * | 6/2008 | Mudunuri | C10G 1/02 166/302 |
| 2015/0237684 | A1 * | 8/2015 | Huber | H05B 6/786 219/700 |

* cited by examiner

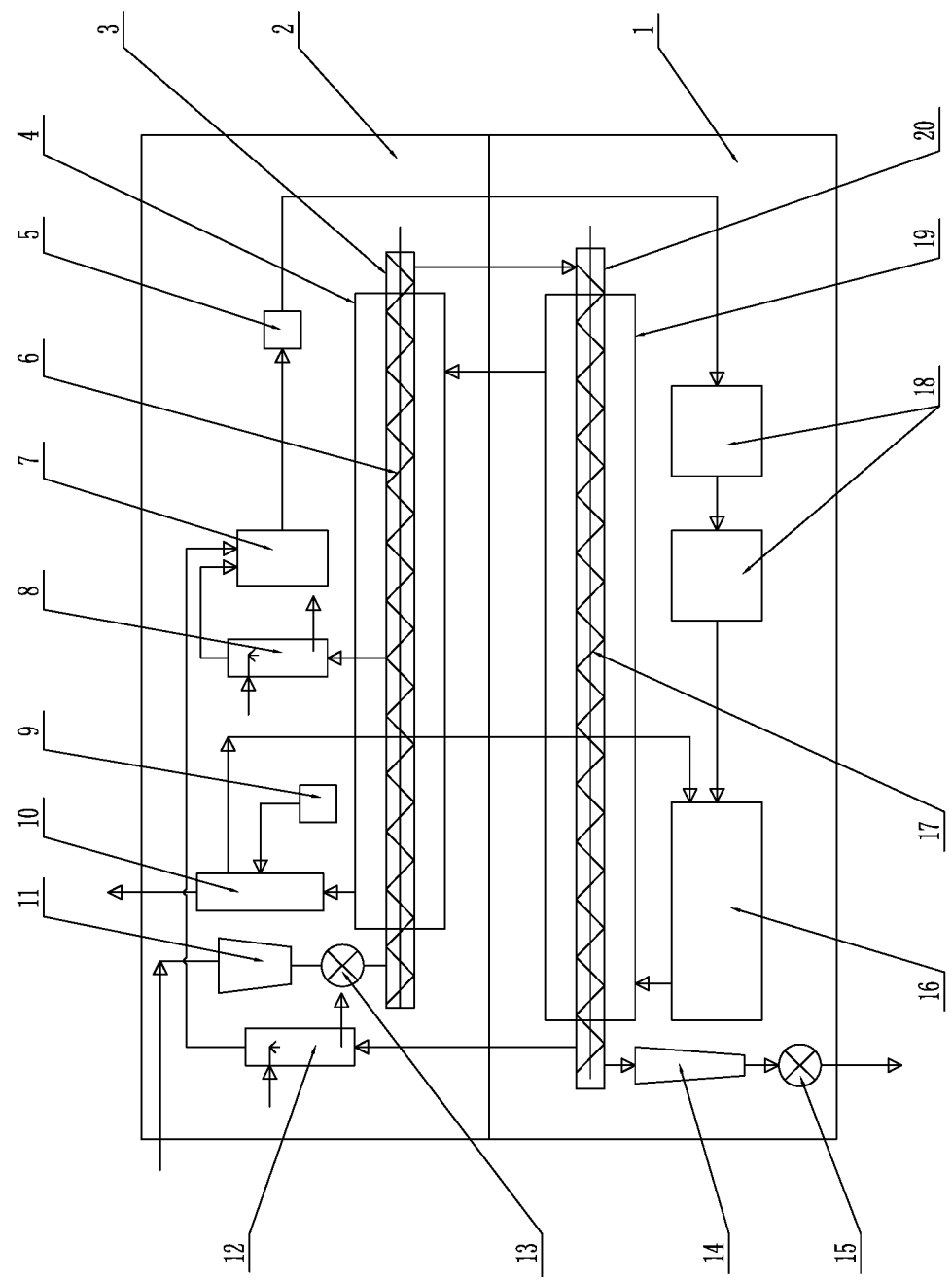

INDIRECT THERMAL DESORPTION DEVICE WITH TWO-SECTION SCREW CONVEYORS

CROSS REFERENCE OF RELATED APPLICATION

This is a U.S. National Stage under 35 U.S.C 371 of the International Application PCT/CN2016/079852, filed Apr. 21, 2016, which claims priority under 35 U.S.C. 119(a-d) to CN 201510207851.8, filed Apr. 27, 2015.

BACKGROUND OF THE PRESENT INVENTION

Field of Invention

The present invention relates to the technical field of a device for contaminated soil remediation, and more particularly to an indirect thermal desorption device with two-section screw conveyors.

Description of Related Arts

Soil, which is an important part of human ecological environment, is an important natural source for the existence of human beings. With the development of social technology and economy and the continuous improvements of people's living standard and health level, there are higher requirements for green environment and the treatment of environmental pollution becomes an important issue for urban construction. With the regulation on industrial structures, a plurality of industrial enterprises previously located on the central areas of multiple cities are closed down or relocated, and large quantities of severe contaminated soil are left, including a large quantity of organic contaminated soil. The severe contaminated soil will pollute the atmosphere and water in the surroundings and has a harmful effect on people's life and health. The contaminated sites are not suitable for being put into new applications until being remediated, so the remediation of contaminated soil has become an important part of environmental protection.

Soil remediation has always been a difficult and hot research topic in the world. Some universities and scientific research departments in China have realized the policy orientation and future requirements of the country and foreseen a large progress space of the industry in the future, and related works have been done in the technical and management field.

Thermal desorption technique is one of the main remediation techniques in the remediation of organic contaminated soil or mercury contaminated soil. The thermal desorption technique utilized direct or indirect heat-exchange heating to make the contaminated components in the soil reach a high enough temperature to evaporate and be separated from the soil media. The separated contaminated components are further treated by incineration, adsorption or chemical reaction. The thermal transmission medium in the thermal desorption device is usually gas, combustion gas, insert gas, high-temperature gas, thermal oil or molten salt and etc. The thermal desorption process is a physical process for the contaminated components in the soils converting into a steam phase from the solid phase or the liquid phase.

A first Chinese patent application with a publication number CN103203355A discloses an ex-situ thermal desorption treatment method for contaminated soil. The contaminated soil is sieved, crushed and piled up. The mound of the contaminated soil has a uniform thickness. A static pressure chamber is provided below the contaminated soil and the contaminated soil is covered by a sealed insulation layer. A main extraction steam tube is provided on a covered surface of the sealed insulation layer, and switching valves are provided on parallel tubes. The object of the patent application CN103203355A is to solve the problems of the high consumption and waste of energy of the thermal treatment technique during the remediation and regeneration process of the contaminated soil.

A second Chinese patent application with a publication number CN103341486A discloses an electromagnetic thermal desorption system for contaminated soil, comprising: a drum type electromagnetic heat absorber, an electromagnetic heating control system, a drum speed control system and a heat exchanger and an exhaust gas purification system. The object of the patent application CN103341486A is to ensure that organic contaminants volatilized from the contaminated soil are brought out of the drum type electromagnetic heat absorber in time. The exhaust gas is treated by heat exchange with cold air and drops the temperature thereof, and the exhaust passes through an exhaust outlet to enter a wet precipitator in the exhaust purification system, and then enter an activated carbon absorber.

A third Chinese patent application with a publication number CN104096709A discloses a thermal desorption device for remediation of mercury contaminated soil. The device comprises: a feed system, a rotary kiln heating system, a dust removing system, a cooling and condensing system, an exhaust gas filtration system, a gas discharge system, a liquid condensate collection system, a precipitation filtration system, a soil cooling system and a discharge system. The patent application CN104096709A is specially designed for mercury contaminated soil, so as to remediate soil contaminated by mercury.

The three patent applications mentioned above all perform part improvement on the conventional thermal desorption technique. The patent application with the publication number CN103203355A is capable of partially decreasing the power consumption, but has disadvantages of long remediation cycle and insufficient remediation. The patent application with the publication number CN103341486A adopts a secondary energy source for heating, and has disadvantages of high disposal cost and difficulty in sealing the drum. The patent application with the publication number CN104096709A adopts the rotary kiln as a main thermal desorption device, but the direct heating adopted thereby needs a secondary treatment of the exhaust gas, the device is complicated, the transportation and installation are inconvenient, and has shortcomings of high operation cost and having risks of secondary contamination.

SUMMARY OF THE PRESENT INVENTION

A technical solution to be solved by the present invention is to provide an indirect thermal desorption device with two-section screw conveyors for treating organic contaminated or mercury contaminated soil, which has characteristic of high treatment capability, high contaminant removal rate, low operation cost, small in volume and easy for transportation and installation.

Accordingly, a technical solution of the present invention is as follows.

An indirect thermal desorption device with two-section screw conveyors, comprising: an upper skid and a lower skid; wherein the upper skid is located above the lower skid;

wherein an upper layer thermal desorption chamber, a feed hopper, a feed airlock, an air pre-heater, a blower; a first quench spray tower, a second quench spray tower, a demister, and an induced draft fan are provided in the upper skid;

a first screw conveyor is provided in the upper layer thermal desorption chamber, and an upper layer fume jacket is covered on the upper layer thermal desorption chamber;

an outlet of the feed hopper is connected and communicated with an inlet of the feed airlock, an outlet of the feed airlock is connected and communicated with a feed inlet on an upper portion of a left end of the upper layer thermal desorption chamber; a feed outlet on a lower portion of a right end of the upper layer thermal desorption chamber is connected and communicated with a feed inlet on an upper portion of a right end of a lower layer thermal desorption chamber via a first tube;

the lower layer thermal desorption chamber, an activated carbon filter tank, a combustion chamber, a discharge hopper and a discharge airlock are provided inside the lower skid;

a second screw conveyor is provided in the lower layer thermal desorption chamber, and a lower layer fume jacket is covered on the lower layer thermal desorption chamber;

a feed outlet on a left end of the lower layer thermal desorption chamber is connected and communicated with an inlet of the discharge hopper, and an outlet of the discharger hopper is connected and communicated with an inlet of the discharge airlock;

a fume outlet on a top portion of the combustion chamber is connected and communicated with an inlet on a lower portion on a left end of the lower layer fume jacket;

an outlet on an upper portion of a right end of the lower layer fume jacket is connected and communicated with an inlet on a lower portion of a right end of the upper layer fume jacket via a second tube;

an outlet on an upper portion of a left end of the upper layer fume jacket is connected and communicated with an inlet of an air pre-heater;

the blower is connected and communicated with the air pre-heater;

an outlet of the air pre-heater is connected and communicated with an inlet of the combustion chamber via a third tube;

a steam outlet on a middle portion of the upper layer thermal desorption chamber is connected and communicated with an inlet of the first quench spray tower;

an outlet of the first quench spray tower is connected and communicated with the inlet of the demister via a fourth tube;

a steam outlet on a left portion of the lower layer thermal desorption chamber is connected and communicated with an inlet of the second quench spray tower;

an outlet of the second quench spray tower is connected and communicated with an inlet of the demister;

an outlet of the demister is connected and communicated with an inlet of the induced draft fan;

an outlet of the induced draft fan is connected and communicated with an inlet of the activated carbon filter tank via a fifth tube; and an outlet of the activated carbon filter tank is connected with an inlet of the combustion chamber.

The indirect thermal desorption device with two-section screw conveyors according to a preferred embodiment of the present invention is illustrated, wherein both the first screw conveyor and the second conveyor are screw conveyors with or without an axle.

The indirect thermal desorption device with two-section screw conveyors according to another preferred embodiment of the present invention is illustrated, wherein lifting slices for facilitating stir of contaminated soil are provided on auger flights of both the first screw conveyor and the second conveyor.

The indirect thermal desorption device with two-section screw conveyors according to another preferred embodiment of the present invention is illustrated, wherein an iron chain for preventing adhering the contaminated soil is provided on the first screw conveyer.

The indirect thermal desorption device with two-section screw conveyors according to another preferred embodiment of the present invention is illustrated, wherein the amount of the activated carbon filter tanks is two, and the two activated carbon filter tanks are connected in series.

The indirect thermal desorption device with two-section screw conveyors according to another preferred embodiment of the present invention is illustrated, wherein the combustion chamber is using energy source like natural gas, diesel oil or biomass fuel which is capable of generating fume with a temperature at a range of 800-1200° C.

By adopting the structure mentioned above, the indirect thermal desorption device with two-section screw conveyors of the present invention has advantages as follows.

During operation process, high-temperature fume with a high temperature at a range of 800-1200° C. generated in the combustion chamber by the power source of natural gas, diesel oil or biomass fuel firstly accesses the lower layer fume jacket, and then enter the upper layer fume jacket. The contaminated soil is firstly crushed and sieved to grains with a diameter of less than 5 cm, and then passes in a continuous and constant speed through the feed hopper and the feed airlock to enter the upper layer thermal desorption chamber. The contaminated soil is moved from a left end to a right end under the rotary of the first screw conveyor, and then preheated and dried in the upper layer thermal desorption chamber, water evaporates into the first quench spray tower to rapidly cool and condense. Condensed liquid can be sent to a water treatment device for further treatment. Non-condensable gas passes through the demister, and enters the activated carbon filter tank. After being filtered in the activated carbon filter tank, the non-condensable gas enters the combustion chamber for high-temperature combustion. The contaminated soil pre-heated and dried in an upper layer thermal desorption chamber, enters the lower layer thermal desorption chamber, and then moves from a right end to a left end under the rotary of the second screw conveyor. The contaminated soil is further heated to a temperature at a range of 200-650° C. in the lower layer thermal desorption chamber. The organic components or mercury contained in the contaminated soil are heated to the boiling point and separated in a form of stream. Then the organic components or mercury steam enter the second quench spray tower to rapidly cool and condense. The condensed liquid can be sent to a water treatment device for further treatment. The non-condensable gas passes through the demister, and enters the activated carbon filter tank under the driven of the induced draft fan. The non-condensable gas is filtered by the activated carbon filter tank and then enters the combustion chamber for high-temperature combustion. When the contaminated soil is treated with the thermal desorption treatment by the upper layer thermal desorption chamber and the lower layer thermal desorption chamber, over 99.9% of the organic components and mercury are desorbed and separated out of the contaminated soil. Then cleaned soil passes through the discharge hopper and the discharge airlock, and then is discharged after cooling down and increasing the humidity. The fume in the upper layer fume jacket enters into the air pre-heater and preheats air from the blower. The preheated air enters into the combustion chamber for assisting combustion. The cooled fume from the air pre-heater reaches the standard and can be emitted directly.

From the operation process mentioned above, the contaminated soil is fed continuously and steadily at a constant rate, the device has great treating capability. Movement direction of the high-temperature fume generated from the combustion chamber in the lower layer fume jacket and the upper layer fume jacket is opposite to the contaminated soil in the upper layer thermal desorption chamber and the lower layer thermal desorption chamber. The removal rate of the contaminant is high, and an air pre-heater is adopted for recycling the waste heat of the fume, therefore utilization ratio of the heat source is high. The present invention adopts high-temperature fume to indirectly heat the upper layer thermal desorption chamber and the lower layer thermal desorption chamber, which indirectly decreases the amount of fume requiring for treatment. The device of the present invention is capable achieving a removal proportion of over 99.9% on organic contaminated soil or mercury contaminated soil, and the operation cost thereof is low. All of the elements in the present invention are provided in an upper skid and a lower skid, which takes full advantage of the space in the upper skid and the lower skid, and the whole volume thereof is very small. When the tubes between the upper skid and the lower skid are disconnected, the upper skid and the lower skid can be separated, so as to facilitate transportation.

These and other objectives, features, and advantages of the present invention will become apparent from the following detailed description, the accompanying drawings, and the appended claims.

BRIEF DESCRIPTION OF THE DRAWINGS

The FIGURE is a flow chart of a technical process of a two-stage dragon indirect thermal desorption device according to a preferred embodiment of the present invention.

Reference numbers in the FIGURE: 1—upper skid; 2—lower skid; 3—upper layer thermal desorption chamber; 4—upper layer fume jacket; 5—induced draft fan; 6—first screw conveyor; 7—demister; 8—first quench spray tower; 9—blower; 10—air pre-heater; 11—feed hopper; 12—first quench spray tower; 13—feed airlock; 14—discharge hopper; 15—discharge airlock; 16—combustion chamber; 17—second screw conveyor; 18—activated carbon filter tank; 19—lower layer fume jacket; 20—lower layer thermal desorption chamber.

DETAILED DESCRIPTION OF THE PREFERRED EMBODIMENT

Further description of an indirect thermal desorption device with two-section screw conveyors of the present invention is illustrated as follows.

Referring to the FIGURE, an indirect thermal desorption device with two-section screw conveyors, comprises: an upper skid 2 and a lower skid 1; wherein the upper skid 2 is located above the lower skid 1;

wherein an upper layer thermal desorption chamber 3, a feed hopper 11, a feed airlock 13, an air pre-heater 10, a blower 9; a first quench spray tower 8, a second quench spray tower 12, a demister 7, and an induced draft fan 5 are provided in the upper skid 2;

a first screw conveyor 6 is provided in the upper layer thermal desorption chamber 3, and an upper layer fume jacket 4 is covered on the upper layer thermal desorption chamber 3;

an outlet of the feed hopper 11 is connected and communicated with an inlet of the feed airlock 13, an outlet of the feed airlock 13 is connected and communicated with a feed inlet on an upper portion of a left end of the upper layer thermal desorption chamber 3; a feed outlet on a lower portion of a right end of the upper layer thermal desorption chamber 3 is connected and communicated with a feed inlet on an upper portion of a right end of a lower layer thermal desorption chamber 20 via a first tube.

The lower layer thermal desorption chamber 20, an activated carbon filter tank 18, a combustion chamber 16, a discharge hopper 14 and a discharge airlock 15 are provided inside the lower skid 1;

a second screw conveyor 17 is provided in the lower layer thermal desorption chamber 20, and a lower layer fume jacket 19 is covered on the lower layer thermal desorption chamber 20;

a feed outlet on a left end of the lower layer thermal desorption chamber 20 is connected and communicated with an inlet of the discharge hopper 14, and an outlet of the discharger hopper 14 is connected and communicated with an inlet of the discharge airlock 15;

a fume outlet on a top portion of the combustion chamber 16 is connected and communicated with an inlet on a lower portion on a left end of the lower layer fume jacket 19;

an outlet on an upper portion of a right end of the lower layer fume jacket 19 is connected and communicated with an inlet on a lower portion of a right end of the upper layer fume jacket 4 via a second tube;

an outlet on an upper portion of a left end of the upper layer fume jacket 4 is connected and communicated with an inlet of an air pre-heater 10;

the blower 9 is connected and communicated with the air pre-heater 10; and an outlet of the air pre-heater 10 is connected and communicated with an inlet of the combustion chamber 16 via a third tube, and a drain opening is provided on a top portion of the air pre-heater 10.

A steam outlet on a middle portion of the upper layer thermal desorption chamber 3 is connected and communicated with an inlet of the first quench spray tower 8;

an outlet of the first quench spray tower 8 is connected and communicated with the inlet of the demister 7 via a fourth tube;

a steam outlet on a left portion of the lower layer thermal desorption chamber 20 is connected and communicated with an inlet of the second quench spray tower 12;

an outlet of the second quench spray tower 12 is connected and communicated with an inlet of the demister 7 and spraying is performed in the first quench spray tower 8 and the second quench spray tower 12;

an outlet of the demister 7 is connected and communicated with an inlet of the induced draft fan 5;

an outlet of the induced draft fan 5 is connected and communicated with an inlet of the activated carbon filter tank 18 via a fifth tube; and an outlet of the activated carbon filter tank 18 is connected with an inlet of the combustion chamber 16.

An amount of the activated carbon filter tanks 18 is two, and the two activated carbon filter tanks are connected in series, and an energy source in the combustion chamber 16 is natural gas, diesel oil or biomass fuel which is capable of generating fume with a temperature at a range of 800-1200° C.

Both the first screw conveyor 6 and the second conveyor 17 are screw conveyors with or without an axle. Lifting slices for facilitating stir of contaminated soil are provided on auger flights of both the first screw conveyor 6 and the second conveyor 17. An iron chain for preventing adhering the contaminated soil is provided on the first screw conveyer 6.

A working principle of the indirect thermal desorption device with two-section screw conveyors of the present invention is as follows. The fume with a high temperature at a range of 800-1200° C. generated in the combustion chamber 16 by the power source of natural gas, diesel oil or biomass fuel firstly accesses the lower layer fume jacket 19, and then enters the upper layer fume jacket 4. The contaminated soil is firstly crushed and sieved to grains with a diameter of less than 5 cm, and then passes in a continuous and constant speed through the feed hopper 11 and the feed airlock 13 to enter the upper layer thermal desorption chamber 3. The contaminated soil is moved from a left end to a right end under the rotary of the first screw conveyor 6, and then preheated and dried in the upper layer thermal desorption chamber 3, water evaporates into the first quench spray tower 8 to rapidly cool and condense. Condensed liquid can be sent to a water treatment device for further treatment. Non-condensable gas passes through the demister 7, and enters the activated carbon filter tank 18. After being filtered in the activated carbon filter tank 18, the non-condensable gas enters the combustion chamber 16 for high-temperature combustion. The contaminated soil is preheated and dried in an upper layer thermal desorption chamber 3 enters the lower layer thermal desorption chamber 20, and then moves from a right end to a left end under the rotary of the second screw conveyor. The contaminated soil is further heated to a temperature at a range of 200-650° C. in the lower layer thermal desorption chamber 20. The organic components or mercury contained in the contaminated soil are heated to the boiling point and separated in a form of stream. Then the organic components or mercury steam enter the second quench spray tower 12 to rapidly cool and condense. The condensed liquid can be sent to a water treatment device for further treatment. The non-condensable gas passes through the demister 7, and enters the activated carbon filter tank 18 under the driven of the induced draft fan 5. The non-condensable gas is filtered by the activated carbon filter tank 18 and then enters the combustion chamber 16 for high-temperature combustion. When the contaminated soil is treated with the thermal desorption treatment by the upper layer thermal desorption chamber 3 and the lower layer thermal desorption chamber, over 99.9% of the organic components and mercury are desorbed and separated out of the contaminated soil. Then cleaned soil passes through the discharge hopper 14 and the discharge airlock 15 and then is discharged after cooling down and increasing the humidity. The fume in the upper layer fume jacket 4 enters into the air pre-heater 10 and preheats air from the blower 10. The preheated air enters into the combustion chamber 16 for assisting combustion. The cooled fume from the air preheater reaches the standard and can be emitted directly.

INDUSTRIAL APPLICABILITY

The present invention has industrial applicability of being applied in remediation device for contaminated soil.

One skilled in the art will understand that the embodiment of the present invention as shown in the drawings and description above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An indirect thermal desorption device with two-section screw conveyors, comprising: an upper skid (2) and a lower skid (1); wherein the upper skid (2) is located above the lower skid (1);

wherein an upper layer thermal desorption chamber (3), a feeding hopper (11), a feed airlock (13), an air preheater (10), a blower (9); a first quench spray tower (8), a second quench spray tower (12), a demister (7), and an induced draft fan (5) are provided in the upper skid (2);

a first screw conveyor (6) is provided in the upper layer thermal desorption chamber (3), and an upper layer fume jacket (4) is covered on the upper layer thermal desorption chamber (3);

an outlet of the feeding hopper (11) is connected and communicated with an inlet of the feed airlock (13), an outlet of the feed airlock (13) is connected and communicated with a feed inlet on an upper portion of a left end of the upper layer thermal desorption chamber (3); a feed outlet on a lower portion of a right end of the upper layer thermal desorption chamber (3) is connected and communicated with a feed inlet on an upper portion of a right end of a lower layer thermal desorption chamber (20) via a first tube;

the lower layer thermal desorption chamber (20), an activated carbon filter tank (18), a combustion chamber (16), a discharge hopper (14) and a discharge airlock (15) are provided inside the lower skid (1);

a second screw conveyor (17) is provided in the lower layer thermal desorption chamber (20), and a lower layer fume jacket (19) is covered on the lower layer thermal desorption chamber (20);

a feed outlet on a left end of the lower layer thermal desorption chamber (20) is connected and communicated with an inlet of the discharge hopper (14), and an outlet of the discharge hopper (14) is connected and communicated with an inlet of the discharge airlock (15);

a fume outlet on a top portion of the combustion chamber (16) is connected and communicated with an inlet on a lower portion on a left end of the lower layer fume jacket (19);

an outlet on an upper portion of a right end of the lower layer fume jacket (19) is connected and communicated with an inlet on a lower portion of a right end of the upper layer fume jacket (4) via a second tube;

an outlet on an upper portion of a left end of the upper layer fume jacket (4) is connected and communicated with an inlet of an air pre-heater (10);

the blower (9) is connected and communicated with the air pre-heater (10);

an outlet of the air pre-heater (10) is connected and communicated with an inlet of the combustion chamber (16) via a third tube;

a steam outlet on a middle portion of the upper layer thermal desorption chamber (3) is connected and communicated with an inlet of the first quench spray tower (8);

an outlet of the first quench spray tower (8) is connected and communicated with the inlet of the demister (7) via a fourth tube;

a steam outlet on a left portion of the lower layer thermal desorption chamber (20) is connected and communicated with an inlet of the second quench spray tower (12);

an outlet of the second quench spray tower (12) is connected and communicated with an inlet of the demister (7);

an outlet of the demister (7) is connected and communicated with an inlet of the induced draft fan (5);

an outlet of the induced draft fan (5) is connected and communicated with an inlet of the activated carbon filter tank (18) via a fifth tube; and an outlet of the activated carbon filter tank (18) is connected with an inlet of the combustion chamber (16).

2. The indirect thermal desorption device with two-section screw conveyors, as recited in claim 1, wherein both the first screw conveyor (6) and the second conveyor (17) are screw conveyors with or without an axle.

3. The indirect thermal desorption device with two-section screw conveyors, as recited in claim 1, wherein lifting slices for facilitating stir of contaminated soil are provided on auger flights of both the first screw conveyor (6) and the second conveyor (17).

4. The indirect thermal desorption device with two-section screw conveyors, as recited in claim 3, wherein an iron chain for preventing adhering the contaminated soil is provided on the first screw conveyer (6).

5. The indirect thermal desorption device with two-section screw conveyors, as recited in claim 1, wherein the amount of the activated carbon filter tanks (18) is two, and the two activated carbon filter tanks are connected in series.

6. The indirect thermal desorption device with two-section screw conveyors, as recited in claim 1, wherein the combustion chamber (16) is using energy sources like natural gas, diesel oil or biomass fuel which is capable of generating fume with a temperature at a range of 800-1200° C.

7. The indirect thermal desorption device with two-section screw conveyors, as recited in claim 1, wherein a drain opening is provided on a top portion of the air pre-heater (10).

8. The indirect thermal desorption device with two-section screw conveyors, as recited in claim 1, wherein the first quench spray tower (8) and the second quench spray tower (12) are sprayed by water.

* * * * *